H. A. MENSING.
CALCULATOR.
APPLICATION FILED NOV. 2, 1911.

1,039,775.

Patented Oct. 1, 1912.

2 SHEETS—SHEET 1.

WITNESSES

INVENTOR
H. A. Mensing
BY _____ Attorney

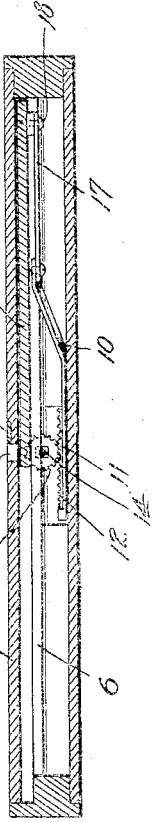

UNITED STATES PATENT OFFICE.

HENRY A. MENSING, OF ROCHESTER, NEW YORK.

CALCULATOR.

1,039,775.  Specification of Letters Patent.  Patented Oct. 1, 1912.

Application filed November 2, 1911. Serial No. 658,177.

*To all whom it may concern:*

Be it known that I, HENRY A. MENSING, a citizen of the United States, residing at Rochester, in the county of Monroe and State of New York, have invented certain new and useful Improvements in Calculators, of which the following is a specification.

The present invention relates to a mechanical calculating device, and has for its primary object to provide a device of this character which embodies novel features of construction whereby the number of square feet in pieces of timber having various lengths and widths may be readily ascertained.

A further object of the invention is to provide a calculator which is comparatively simple and inexpensive in its construction, which can be easily and quickly manipulated, which has a comparatively wide range of action, and which will enable the number of square feet in any given piece of timber to be quickly ascertained.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1:
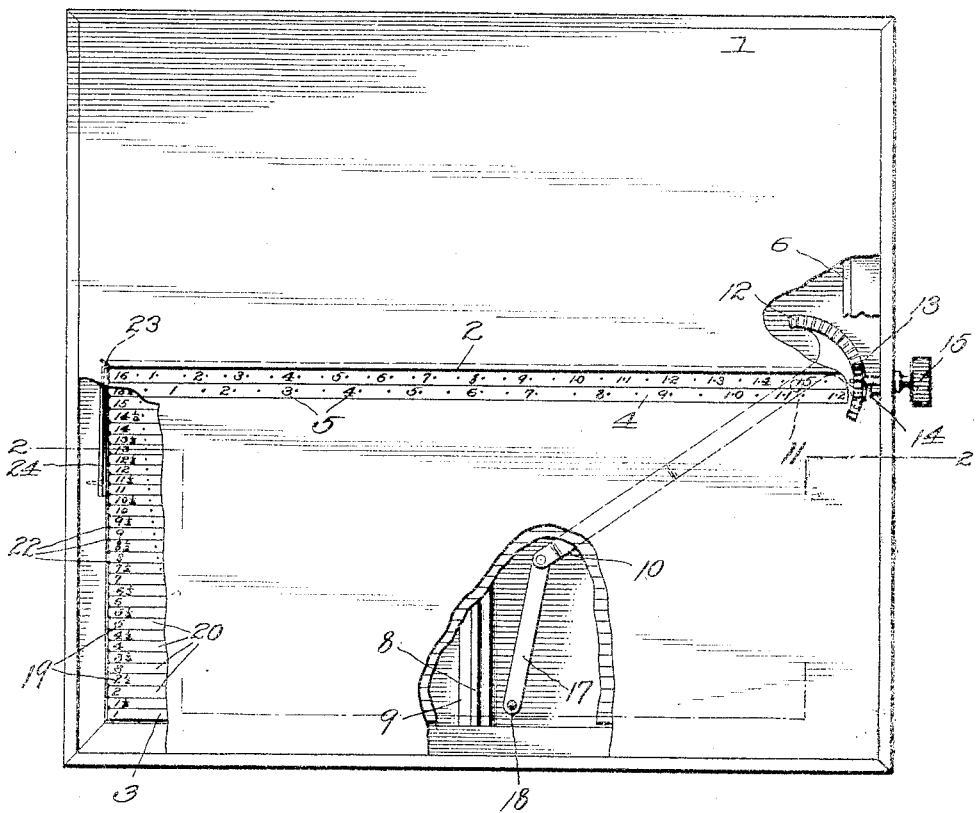
Figure 2:
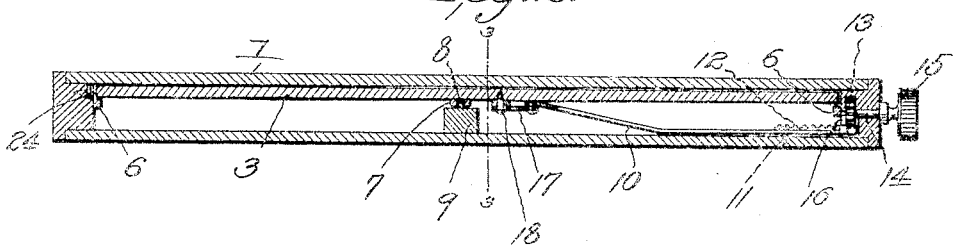

Figure 1 is a top plan view of a calculator constructed in accordance with the invention, portions being broken away and shown in section. Fig. 2 is a longitudinal sectional view on the line 2—2 of Fig. 1. Fig. 3 is a transverse sectional view on the line 3—3 of Fig. 2, and Fig. 4 is a top plan view of a slide adapted to be employed in a device of this character.

Corresponding and like parts are referred to in the following description and indicated in all the views of the drawings by the same reference characters.

Specifically describing the present embodiment of the invention, the numeral 1 designates a flat rectangular casing which is provided in the top thereof with a longitudinally disposed slot 2. This slot is arranged at substantially the middle portion of the casing and constitutes a view opening through which certain portions of the tabulated slide 3 are visible. A scale 4 is applied to the top of the casing 1 and extends along one of the edges of the slot 2 so that the various characters of the scale can coöperate with the characters upon the tabulated slide to indicate the desired results. In the preferred construction the scale 4 is divided into inch spaces which are consecutively numbered from left to right, the characters 5 of the scale being utilized to indicate the width of the piece of timber.

The tabulated slide 3 is arranged under the top of the casing 1, the edges of the slide resting loosely upon ribs 6 which project from the sides of the casing. The slide moves transversely with respect to the opening or slot 2 and is provided at the middle thereof with a pair of transverse ribs 7 which receive a rib 8 between them, the said rib 8 being carried by a batten or slat 9 secured to the bottom of the casing. The slide is thus held securely against any lateral twisting or turning movement and supported adjacent the top of the casing 1, although the said slide is perfectly free to move in a direction parallel to the rib 8 and transverse to the slot 2.

An operating lever 10 is pivotally mounted at 11 upon the bottom of the casing 1, the short end of the lever being provided with a segmental rack 12 which is concentric to the pivot 11 and is engaged by a pinion 13 at the inner end of a shaft 14 which is journaled within one of the sides of the casing. The outer end of the shaft projects upon the exterior of the casing where it is provided with a knurled finger piece 15. Attention may be directed to the fact that the segmental rack 12 is movable through a cut away portion 16 of the side of the casing, the before mentioned pinion 13 being also received within this cut away portion of the side of the casing so as to prevent the same from interfering in any manner with the action of the tabulated slide. The opposite end of the operating lever 10 is deflected upwardly away from the bottom of the casing and connected by a link 17 to the slide 3, the said link being secured to the slide by means of a screw or pin 18. With this construction, it will be obvious that by grasping the finger piece 15 and turning the same the operating lever 10 can be swung about its pivot 11 so as to quickly shift the tabulated slide 3 and bring the same into any desired position with respect to the view slot 2.

The tabulated slide 3 of Fig. 1 and the tabulated slide 3ª of Fig. 4 are similar in construction, the only difference being that the slide 3ª is slightly larger and would admit of a wider range of work. The tabular slide is provided at one edge thereof, in the present instance at the left hand edge, with a column of figures 19 which serve to indicate the length of the piece of timber in feet. In Fig. 1 this series of figures extends by the half foot from one foot to sixteen feet. The face of the tabular slide is divided by a series of lines into longitudinal spaces 20 corresponding to the various numerals of the column 19 and adapted to be brought successively under the view slot 2 so as to be visible through the same. Each of the longitudinal divisions or spaces 20 of the tabular slide is provided with a series of characters 21 which are peculiarly arranged and tabulated so as to coöperate with the characters of the scale 4 to indicate the number of square feet in the piece of timber. Assuming that it is desirable to find the number of square feet in a piece of timber sixteen feet and six inches wide. The slide 3 would be manipulated until the longitudinal division 20 thereon having the character 16 at the left hand end thereof were brought directly under the view slot 2, this position being indicated in Fig. 1. That one of the characters 21 opposite the character 6 of the scale 4 will indicate the answer to the problem. As indicated by Fig. 1, the numeral 8 of the scale 21 is brought opposite the character 6 of the scale 4, thereby indicating that there are eight square feet in the said piece of timber. In a similar manner the number of square feet in any piece of timber having a length and width within the scope of the various scales can be quickly determined by moving the slide 3 until the character of the scale 19 corresponding to the length of the piece of timber is brought under the view slot 2, and then ascertaining that character of the scale 21 which is opposite the numeral of the scale 4 corresponding to the width in inches of the piece of timber.

For the purpose of holding the slide 3 against accidental displacement, a series of notches 22 are formed in one end of the slide, the said notches being adapted to be engaged by a nose 23 at one end of a spring strip 24 which is let into a side of the casing. This spring detent which coöperates with the notches does not prevent the slide from being forcibly moved when the finger piece 15 is turned, although the slide is held against accidental displacement.

Having thus described the invention, what I claim as new and desire to secure by Letters Patent, is:—

1. In a calculator, the combination of a flat casing having a view slot in the top thereof, a tabular slide mounted within the casing so as to have various portions thereof brought under the view slot, an operating lever pivotally mounted within the casing and provided at one end thereof with a segmental rack, a pinion engaging the rack, a shaft carrying the pinion and extending through one side of the casing, a finger piece applied to the outer end of the shaft, and a link loosely connecting the opposite end of the lever to the slide.

2. In a calculator, the combination of a flat casing having a view slot therein and having the interior of one of the sides thereof cut away, a tabular slide mounted within the casing and adapted to have different portions thereof brought under the view slot, an operating lever pivoted between its ends within the casing and provided at one end thereof with a segmental rack movable through the cut away portion of the side of the casing, a binding arranged within the cut away portion of the side of the casing and engaging the rack, a shaft rigid with the pinion and extending through the casing, a finger piece applied to the outer end of the shaft, and a link loosely connecting the opposite end of the operating lever to the slide.

3. In a calculator, the combination of a flat casing having a slot in the top thereof and provided at its sides with inwardly projecting ribs, a batten applied to the bottom of the casing and provided at the top thereof with a rib, a tabular slide having the ends thereof resting upon the ribs at the sides of the casing and provided with a pair of downwardly projecting ribs fitting upon opposite sides of the rib upon the batten, the said tabular slide being movable to bring different portions thereof under the view slot, a main operating lever pivoted between its ends upon the bottom of the casing and provided at one end thereof with a segmental rack, a pinion engaging the said rack, a shaft rigid with the pinion and passing through the casing, a finger piece applied to the outer end of the shaft, and a link loosely connecting the opposite end of the lever to the slide.

4. In a device for calculating the number of square feet in a piece of timber, the combination of a flat casing having a slot in the top thereof and provided at its sides with inwardly projecting ribs, a scale arranged at one edge of the view slot and having characters thereon adapted to indicate the width of the piece of timber in inches, a slide arranged within the casing and mounted upon the before mentioned ribs, the said slide being provided at one end thereof with a transverse series of characters adapted to indicate the length of the piece of timber in feet and arranged to be brought successively under the view slot as the slide is moved, the said slide being formed with a longitudinal scale for each character of the said transverse series of characters, the longitudinal scales being brought under the view slot simultaneously with the characters of the transverse series and coöperating with the scale at one end of the view slot to indicate the square feet contained by a piece of timber having the length in feet indicated by that one of the transverse series of characters which is visible and the width indicated by the scale at the edge of the slot, an operating lever pivoted at its ends upon the bottom of the casing and provided at one end thereof with a segmental rack, a pinion engaging the rack, a finger piece rigid with the pinion, and a link loosely connecting one end of the lever to the slide.

5. In a calculator, the combination of a flat casing having a slot therein, a tabular slide mounted within the casing and movable to bring different portions thereof under the view slot, the said slide having a series of notches in one end thereof, a spring strip applied to the casing and provided with a nose adapted to engage the notches to hold the slide against accidental movement, a lever pivoted between its ends upon the casing and provided at one end thereof with a segmental rack, a pinion engaging the rack, a finger piece rigid with the pinion, and a link loosely connecting the opposite end of the lever to the slide.

In testimony whereof I affix my signature in presence of two witnesses.

HENRY A. MENSING.

Witnesses:
 WM. H. HEINTZ,
 AUGUST J. DENTINGER.